(12) United States Patent
Wu et al.

(10) Patent No.: US 7,837,376 B2
(45) Date of Patent: Nov. 23, 2010

(54) IMAGE DISPLAY APPARATUS

(75) Inventors: Meng-Chai Wu, Jhubei (TW);
 Chien-Lung Lee, Mingjian Town (TW)

(73) Assignee: Lextar Electronics Corporation, Hsinchu (JP)

( * ) Notice: Subject to any disclaimer, the term of this patent is extended or adjusted under 35 U.S.C. 154(b) by 166 days.

(21) Appl. No.: 12/191,346

(22) Filed: Aug. 14, 2008

(65) Prior Publication Data

US 2009/0290378 A1    Nov. 26, 2009

(30) Foreign Application Priority Data

May 20, 2008    (TW) .............................. 97118518 A

(51) Int. Cl.
 *F21V 7/04* (2006.01)
(52) U.S. Cl. .................. 362/617; 362/607; 362/618; 362/634
(58) Field of Classification Search ................. 362/600, 362/606, 607, 612, 613, 617, 618, 634
 See application file for complete search history.

(56) References Cited

U.S. PATENT DOCUMENTS

| 6,871,975 | B2 * | 3/2005 | Chuang ........................ 362/27 |
| 7,111,974 | B2 * | 9/2006 | Mizutani et al. ............. 362/607 |
| 7,360,938 | B2 * | 4/2008 | Mizuyoshi ................. 362/616 |
| 7,452,121 | B2 * | 11/2008 | Cho et al. .................... 362/633 |

\* cited by examiner

*Primary Examiner*—John A Ward
(74) *Attorney, Agent, or Firm*—Grossman, Tucker, Perreault & Pfleger, PLLC

(57) ABSTRACT

An image display apparatus comprising a light guide plate, a light-emitting diode (LED), a first transparent substrate and a second transparent substrate is provided. Light generated from the LED is guided into the light guide plate through the edge thereof, and outwardly projected through the two opposite surfaces of the light guide plate. Thus, a pattern being disposed in front of the first transparent substrate or the second transparent substrate would be lighted up.

8 Claims, 3 Drawing Sheets

IMAGE DISPLAY APPARATUS

This application claims the benefits of the priority based on Taiwan Patent Application No. 097118518 filed on May 20, 2008; the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to an image display apparatus, and particularly, relates to an image display apparatus adapted to present a static image.

2. Descriptions of the Related Art

Image display apparatuses commonly found in daily life to present static images are usually used to display a particular static image for an extended duration within a particular time interval and at a particular site, e.g., advertisement light boxes, guiding signs or the like. Conventional image display apparatuses usually adopt a conventional fluorescent lamp or a light bulb disposed directly beneath a transparent substrate as a light source, so that light from the fluorescent lamp or the light bulb transmits through the transparent substrate to present an image or character on the transparent substrate.

However, the conventional image displaying method that adopts a fluorescent lamp or a light bulb as a light source has the following disadvantages. Firstly, the large volume of the fluorescent lamp or light bulb causes the overall volume of the image display apparatus to be enlarged accordingly. Secondly, fluorescent lamps or light bulbs currently available still have a high power consumption which goes against the power-saving requirements, and tends to cause a high temperature after having worked for a period of time, so additional considerations have to be made for heat dissipation of the image display apparatuses. Further, as light emitted from the fluorescent lamps or light bulbs is conventionally projected directly to a transparent substrate without being subjected to any further processing, the user who watches the illuminated image or character may still perceive bright and dark areas or even the shape of the light source itself, resulting in a poor imaging effect.

Furthermore, conventional image display apparatuses have less flexibility in design, i.e., transparent substrates thereof mostly have invariable images or characters which are difficult to be updated. For example, a restaurant operator may want to use a conventional image display apparatus to display a menu or advertisement information, but once such information needs to be updated, the operator will have to re-produce a new advertising light box in order to display new information. This not only increases the cost for user, but also restricts to alter the new information flexibly.

In view of this, it is highly desirable in the art to provide an image display apparatus that is more lightweight, thinner, power-saving, and allows a user to update information to be presented more easily.

SUMMARY OF THE INVENTION

One objective of this invention is to provide an image display apparatus which adopts a light emitting diode (LED) as a light source. As the LED has a longer service life, can be replaced individually, and inherently has lower power consumption, this may reduce the cost and power consumption remarkably.

Another objective of this invention is to provide an image display apparatus. By using a light guide plate and disposing an LED at an edge of the light guide plate, light is adapted to be guided into the light guide plate from the edge thereof, then reflected and refracted appropriately in the light path and finally converted into a uniform surface light source. This may effectively enhance the imaging quality and remarkably reduce the volume and thickness of the image display apparatus.

Yet a further objective of this invention is to provide an image display apparatus, which achieves a dual-side display by using a single light source and allows for convenient adjustment of images to be displayed.

To this end, an image display apparatus of this invention comprises a light guide plate, a light-emitting diode (LED), a first transparent substrate and a second transparent substrate. The light guide plate has a first light emitting surface, a second light emitting surface opposite to the first light emitting surface, and an edge. The LED is disposed adjacent to the edge of the light guide plate for projecting light towards the light guide plate. The first transparent substrate is disposed adjacent to the first light emitting surface of the light guide plate, and the second transparent substrate is disposed adjacent to the second light emitting surface of the light guide plate, wherein a pattern is formed on at least one of the first transparent substrate and the second transparent substrate. Thus, light from the LED is adapted to be guided into the light guide plate and projected outwardly through the first transparent substrate and the second transparent substrate. Thereby, light from the LED is able to light up a pattern presented in front of the at least one of the first transparent substrate and the second transparent substrate.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, this invention will be explained with reference to embodiments thereof. However, these embodiments are not intended to limit that this invention can only be embodied in any specific context, applications or with particular methods described in these embodiments. Therefore, description of these embodiments is only for purpose to illustrate rather than to limit this invention. It should be noted that, in the following embodiments and the attached drawings, elements not related directly to this invention are omitted from depiction.

Figure 1:
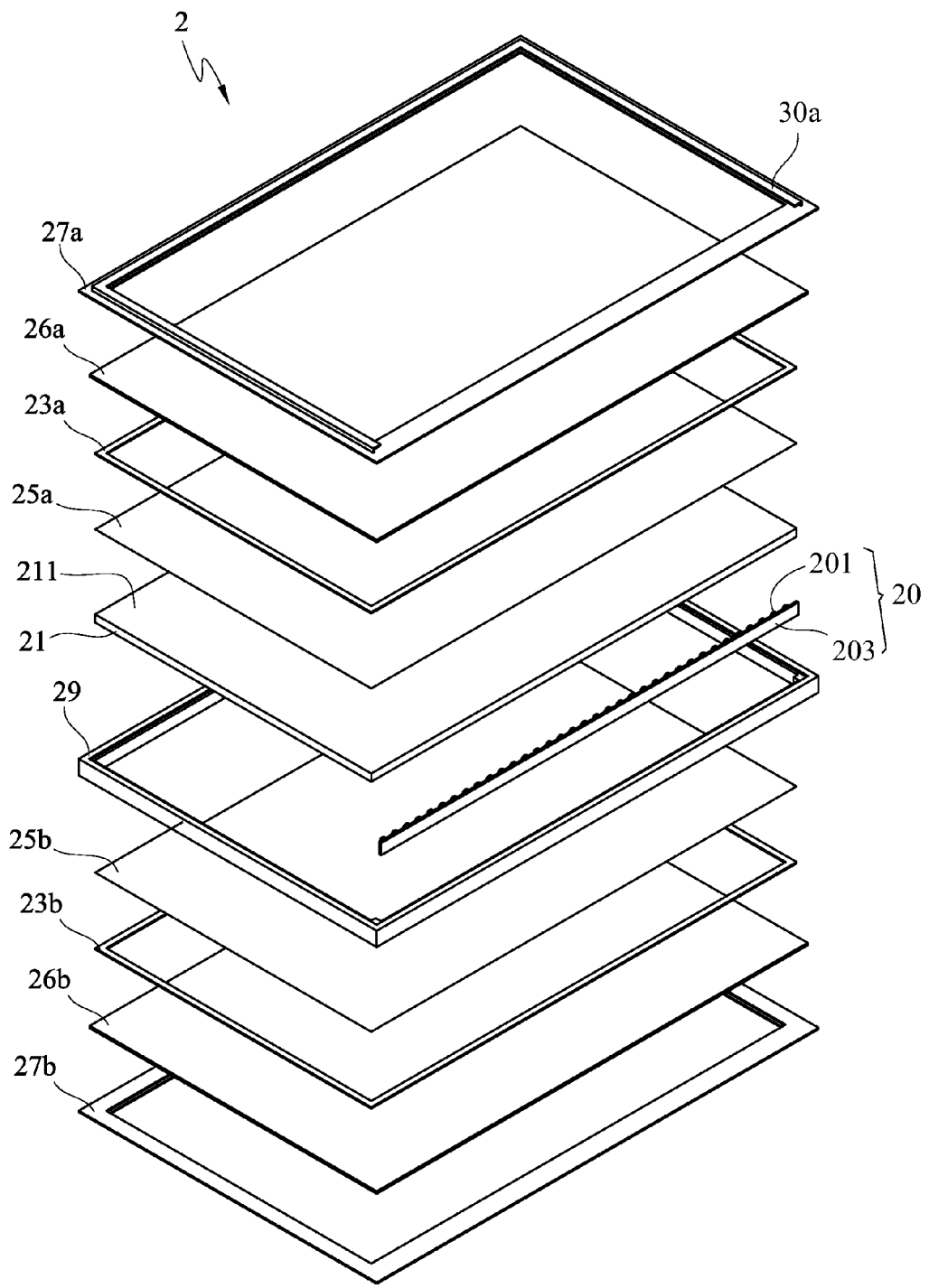
FIG. 1 is an exploded view illustrating individual elements in an image display apparatus of this invention.

A first embodiment of this invention is depicted in FIG. 1, which illustrates an exploded view of an image display apparatus 2 capable of displaying a static image on both sides. The image display apparatus 2 comprises a light guide plate 21, a frame 29, and a light emitting module 20. Further, from the light guide plate 21 upwards, the image display apparatus 2 further comprises an optical film 25a, a light shielding strip 23a, a first transparent substrate 26a and an iron frame 27a in sequence. Likewise, similar structures also exist on the other side of the light guide plate 21; as shown in FIG. 1, from the light guide plate 21 downwards, the image display apparatus 2 comprises an optical film 25b, a light shielding strip 23b, a second transparent substrate 26b and an iron frame 27b in sequence. With such an arrangement, a dual-side display effect is accomplished. It should be appreciated that, the arrangement order, structures and dimensions of these elements disclosed above in this embodiment are only for purpose of illustration, rather than to limit this invention.

Figure 2:
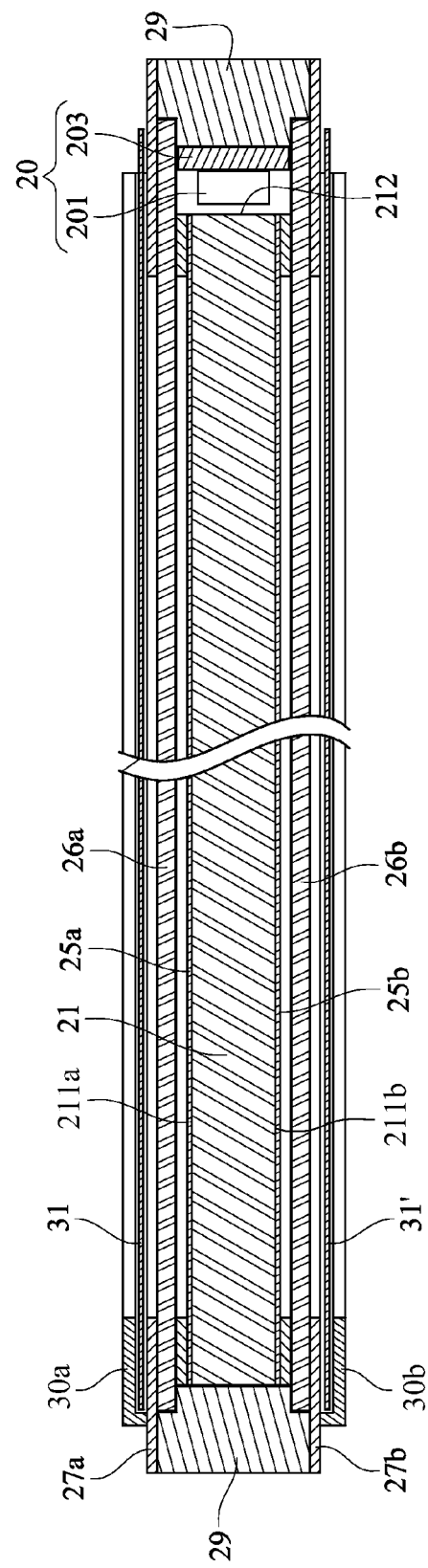
FIG. 2 is a side view of an image display apparatus of this invention.

In order to explain the arrangement relationships among individual elements of the image display apparatus 2 more clearly, refer to FIG. 2 together, which is a side view of the image display apparatus 2 of this invention. The frame 29 is adapted to form a receiving space for receiving the light guide plate 21, the optical films 25a, 25b, the first transparent substrate 26a, the second transparent substrate 26b and the light emitting module 20 therein. Generally speaking, because the light guide plate 21 is injection molded, it is particularly suitable for a medium- or small-sized image display apparatus 2. Finally, the iron frames 27a, 27b are disposed at both sides of the frame 29 respectively to fix the optical elements described above into the image display apparatus 2. Preferably, the frame 29 is made of a thermal conductive material, e.g., a metallic material. In this embodiment, the light emitting module 20 comprises at least one LED 201 and a circuit board 203, and preferably, the LED 201 is directly disposed on the circuit board 203 and electrically connected with the circuit board 203.

More specifically, the light guide plate 21 may be defined to have a first light emitting surface 211a, a second light emitting surface 211b opposite to the first light emitting surface 211a, and an edge 212. The LED 201, which is disposed adjacent to the edge 212 of the light guide plate 21, is adapted to project light towards the light guide plate 21, so that the light is guided into the light guide plate 21 from the edge 212 thereof and projected outwards through the first light emitting surface 211a and the second light emitting surface 211b to form a uniform surface light source at both sides. As the image display apparatus 2 of this embodiment has a dual-side display structure, a detailed description will be made only on how the light is projected through the first light emitting surface 211a of the light guide plate 21, and the process of projecting the light through the second light emitting surface 211b of the light guide plate 21, which is roughly the same, may be readily appreciated by those skilled in the art and thus will not be described again herein.

After being projected outwards from the first light emitting surface 211a of the light guide plate 21, the light travels through the optical film 25a and the first transparent substrate 26a in sequence. The optical film 25a may be a diffusion film, a polarization film, or a brightness enhancement film for increasing uniformity of the surface light source and the optical performance. A light shielding strip 23a may be further disposed between a periphery of the optical film 25a and the frame 29 to prevent light leakage therebetween.

In this embodiment, the surface light source formed by the optical elements is adapted to light up a pattern presented in front of the first transparent substrate 26a or the second transparent substrate 26b. The pattern may be a pattern or character printed directly on the first transparent substrate 26a or manually drawn by a user on the first transparent substrate 26a directly with a marker pen or a sign pen, and may be erased or updated as desired. Similarly, for the light projected outwards from the second light emitting surface 211b of the light guide plate 21, the process is just the same as what described above and thus will not be described again.

Figure 3:
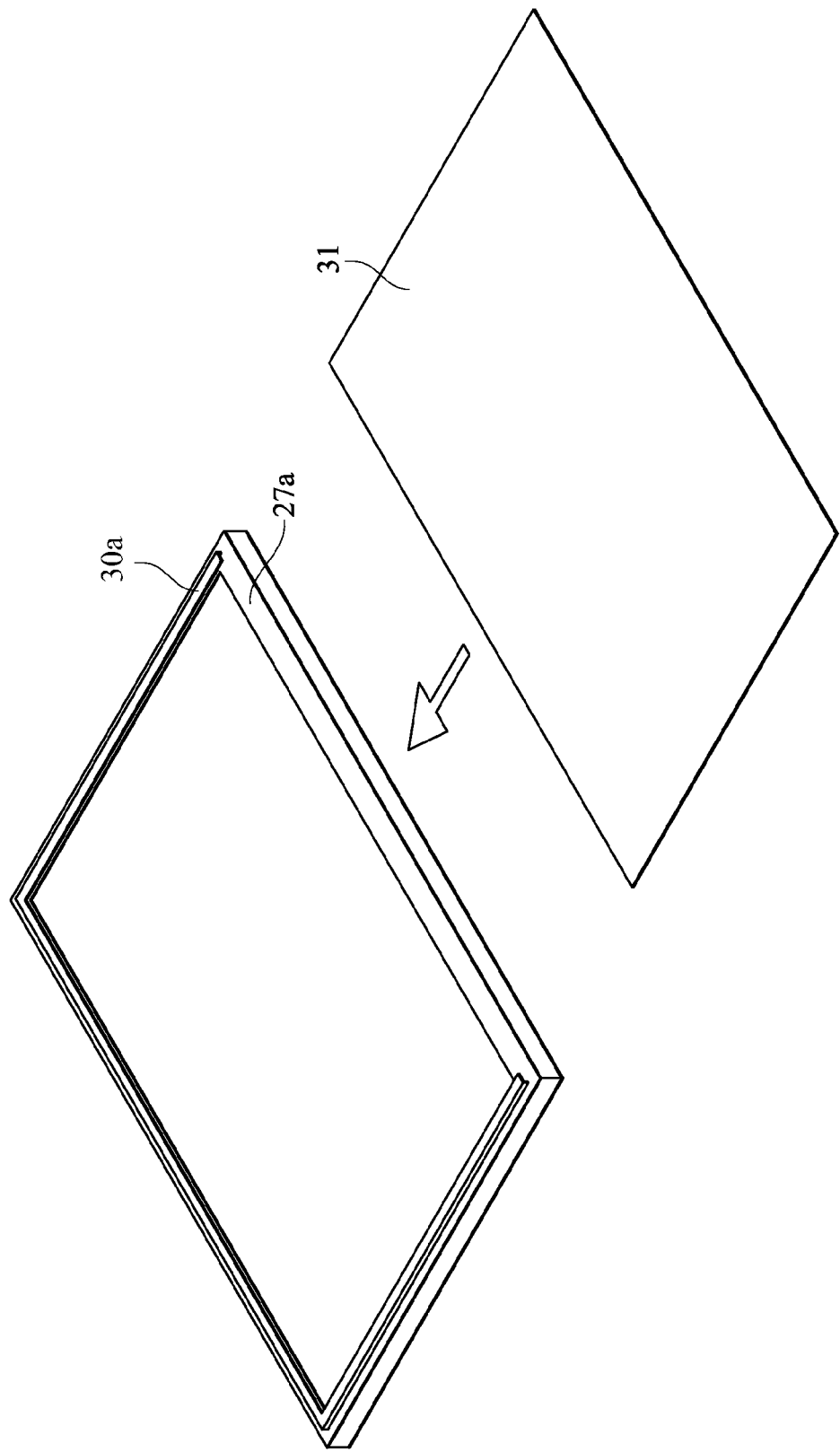
FIG. 3 is a schematic view of an image display apparatus having a replacement structure.

A second embodiment of this invention is a preferred design based on the first embodiment, in which the iron frames 27a, 27b are provided with replacement structures 30a, 30b respectively. Referring to FIGS. 1 to 3, each of the replacement structures 30a, 30b forms a space with the first transparent substrate 26a or the second transparent substrate 26b respectively, with the space having an opening at a side thereof for a transparent film 31, 31' to pass through. The transparent films 31, 31' may be pre-coated with a pattern or character. For example, the transparent films 31, 31' may be conventional transparent projection sheets. When it is desired to update the information to be presented, the original transparent films 31, 31' coated with a pattern or character may be removed from the image display apparatus 2 via the replacement structure 30a, 30b, and then new transparent films 31, 31' substitute for the original transparent films 31, 31' coated with a pattern or character.

As described above, the image display apparatus 2 of this invention is lightweight, thin, has small volume and low power consumption, can achieve a dual-side display effect by simply using a single light emitting module 20, and is convenient to change the static pattern to be presented. Hence, the image display apparatus 2 may be placed on an exhibition cabinet or suspended, and may be powered by a number of batteries or by an external direct current (DC) or alternate current (AC) power supply. As a result, the image display apparatus 2 can be placed at any places as desired to present desired information without being restricted by places.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image display apparatus, comprising:
    a light guide plate having a first light emitting surface, a second light emitting surface opposite to the first light emitting surface, and an edge;
    a light-emitting diode (LED) disposed adjacent to the edge of the light guide plate for projecting light towards the light guide plate;
    a first transparent substrate disposed adjacent to the first light emitting surface of the light guide plate;
    a second transparent substrate disposed adjacent to the second light emitting surface of the light guide plate;
    a transparent film, disposed outside the first transparent substrate or the second transparent substrate, wherein a pattern is formed on the transparent film; and
    a frame, defining a receiving space where the light guide plate, the LED, the first transparent substrate and the second transparent substrate are disposed therein, the frame comprising a replacement structure, in which the transparent film is adapted to be disposed on or removed from the image display apparatus through the replacement structure;
        wherein the light is adapted to be guided into the light guide plate from the edge thereof, and outwardly projected through the first light emitting surface and the second light emitting surface; thereby the pattern presented in front of one of the first transparent substrate and the second transparent substrate is capable of being lighted up.

2. The image display apparatus as claimed in claim 1, further comprising a circuit board electrically connected to the LED.

3. The image display apparatus as claimed in claim 2, wherein the LED is directly disposed on the circuit board.

4. The image display apparatus as claimed in claim 2, further comprising an optical film disposed between the first transparent substrate and the light guide plate, or the second transparent substrate and the light guide plate.

5. The image display apparatus as claimed in claim 4, wherein the optical film is selected from the group consisting of: a diffusion film, a polarization film, and a brightness enhancement film.

6. The image display apparatus as claimed in claim 2, wherein the circuit board is disposed in the receiving space formed by the frame.

7. The image display apparatus as claimed in claim 6, wherein the frame is made of a thermal conductive material.

8. The image display apparatus as claimed in claim 7, wherein the thermal conductive material is a metallic material.

* * * * *